United States Patent [19]
Lind et al.

[11] 3,761,515
[45] Sept. 25, 1973

[54] PREPARATION OF POTASSIUM TEREPHTHALATE

[75] Inventors: Wilton H. Lind; Robert W. Campbell, both of Petaluma, Calif.

[73] Assignee: Chevron Research Company, San Francisco, Calif.

[22] Filed: Oct. 21, 1971

[21] Appl. No.: 191,341

[52] U.S. Cl. ............................................. 260/515 P
[51] Int. Cl. ............................................. C07c 63/26
[58] Field of Search .................................. 260/515 P

[56] References Cited
UNITED STATES PATENTS

| | | | |
|---|---|---|---|
| 2,864,860 | 12/1958 | Walker | 260/515 |
| 3,590,078 | 6/1971 | Murase et al. | 260/515 |
| 2,863,914 | 12/1958 | Raecke et al. | 260/515 |
| 3,101,368 | 8/1963 | Schenk | 260/515 |
| 3,546,282 | 12/1970 | Murase et al. | 260/515 |

FOREIGN PATENTS OR APPLICATIONS

| | | | |
|---|---|---|---|
| 1,168,886 | 4/1964 | Germany | 260/515 |

*Primary Examiner*—James A. Patten
*Attorney*—J. A. Buchanan, Jr., Magdeburger G. F. and John Stoner, Jr.

[57] ABSTRACT

Potassium terephthalate is prepared by conversion of mixture of potassium benzoate and potassium orthophthalate.

4 Claims, No Drawings

PREPARATION OF POTASSIUM TEREPHTHALATE

This invention relates to a novel method for the preparation of dipotassium terephthalate. More particularly, the invention is concerned with a superior new method for the preparation of dipotassium terephthalate by conversion of a mixture of potassium benzoate and potassium orthophthalate.

Two somewhat different commercial processes for the preparation of terephthalic acid from potassium salts of aromatic acids are currently in operation. These are both variations of the so-called "Henkel Process." In one process potassium benzoate is converted to dipotassium terephthalate, which is then acidified to give terephthalic acid. For each mol of benzoate converted to terephthalate another mol is converted to benzene, which is usually recovered. Under typical operating conditions the molar yield of terephthalate ranges from about 50 to 60 percent of theoretical. In the other commercial process potassium orthophthalate is the feedstock. In this process the molar yields of terephthalate are in the range of from about 80 to 85 percent.

SUMMARY OF THE INVENTION

A novel method for the preparation of dipotassium terephthalate has now been found which comprises reacting a mixture of potassium benzoate and potassium orthophthalate in the presence of carbon dioxide, said mixture containing potassium benzoate and potassium orthophthalate in a molar ratio of from about 60:40 to about 30:70.

In accordance with the method of the present invention substantially increased yields of dipotassium terephthalate are obtained as compared to yields which result from the conversion of either potassium benzoate or potassium orthophthalate feedstocks alone.

The reaction of potassium benzoate to give potassium terephthalate in the above process may be illustrated by the following chemical equation:

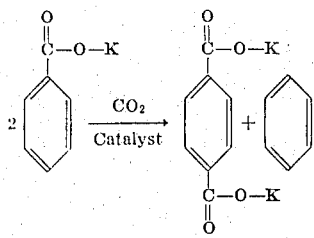

The reaction of potassium orthophthalate to give potassium terephthalate in the above process may be illustrated by the following chemical equation:

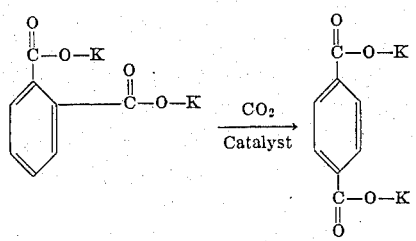

The conversion of potassium benzoate and dipotassium orthophthalate to dipotassium terephthalate is generally carried out at temperatures in the range of from about 250°C to about 450°C. Preferred temperatures are ordinarily above about 350°C. The pressure at which the conversion is ordinarily accomplished is obtained from the carbon dioxide. Pressures of from about 20 to as high as about 4,000 atmospheres may be used. A heavy metal type catalyst is desirable. Metals such as zinc, cadmium, mercury, lead, iron or other heavy metals may be used either in elemental form or in the form of oxides or salts such as cadmium oxide, cadmium carbonate, zinc carbonate, etc. The catalyst concentrations are usually in the range of from about 1 to 5 weight percent on the basis of the mixed potassium benzoate and dipotassium orthophthalate feed. The conversion ordinarily takes only a few minutes, although any time from about 5 minutes to 12 hours or more may be used.

Following the conversion of the mixed potassium benzoate and dipotassium orthophthalate the potassium terephthalate may be separated from the reaction product according to conventional means, including the use of aqueous slurries as well as centrifugation or filtration. The benzene by-product may be recovered by distillation, scrubbing and the like. Unreacted materials may be recycled to the process. Free terephthalic acid is conveniently obtained from the dipotassium terephthalate salt by the usual methods including acidification, which may be carried out in aqueous form for practical purposes.

In a typical recovery process the crude reaction product mixture is mixed with water. The insoluble components, including catalyst and by-products, may be removed by filtration. The solution containing the product is then acidified with sulfuric or hydrochloric acid or a fatty acid such as acetic acid. The resulting terephthalic acid and other acids are separated by physical means such as precipitation, filtration, and the like due to their different solubilities.

In illustration of the method of preparing dipotassium terephthalate in accordance with the present invention a number of experiments were carried out. Unless otherwise specified, the proportions in the following examples of these experiments are on a weight basis. Since a 100 percent theoretical or 100 percent stoichiometric yield on the basis of the potassium benzoate gives only a 50 percent molar yield due to the equimolar yield of benzene, calculations for molar yields of dipotassium terephthalate from potassium benzoate are therefore based on one-half of the mols of potassium benzoate converted. Weight percent yields, on the other hand, refer to the weight of dipotassium terephthalate in the reaction mixture from which benzene has been removed.

The reactors were stainless steel pressure tubes, about 6 inches long and one-half inch O.D., equipped with a screw-on cap having a gas inlet tube and a pressure gauge. The internal volume was 15 ml. The tubes were charged with about 5 grams of potassium benzoate, dipotassium orthophthalate, or mixtures thereof, along with a cadmium catalyst. The tubes were then sealed and charged to the desired pressure with carbon dioxide. Loading of the tubes were carried out in a dry box to insure anhydrous reaction conditions. The the art that modifications and variations of the illustrative examples may be made in the practice of the invention within the scope of the following claims.

We claim:

1. In a process for preparing dipotassium terephthalate by reacting dipotassium orthophthalate at elevated temperatures and pressures in the presence of carbon dioxide and a heavy metal catalyst, the improvement which consists of combining potassium benzoate with said dipotassium orthophthalate in a molar ratio of from about 60:40 to about 30:70.

2. The process in accordance with claim 1 in which the reaction is carried out at temperatures in the range of from about 250°C to about 450°C and pressures of from about 20 to about 4,000 atmospheres.

3. The process in accordance with claim 1 in which the dipotassium terephthalate is acidified to give terephthalic acid.

4. The process in accordance with claim 1 in which the heavy metal catalyst is cadmium oxide or cadmium carbonate.

* * * * *